United States Patent [19]

Feldkämper

[11] Patent Number: 4,671,723

[45] Date of Patent: Jun. 9, 1987

[54] APPARATUS FOR PUSHING STACKS OR PACKS FROM A SUPPORT

[75] Inventor: Richard Feldkämper, Lengerich, Fed. Rep. of Germany

[73] Assignee: Windmöller & Hölscher, Lengerich, Fed. Rep. of Germany

[21] Appl. No.: 723,871

[22] Filed: Apr. 16, 1985

[30] Foreign Application Priority Data

Apr. 19, 1984 [DE] Fed. Rep. of Germany ....... 3414996

[51] Int. Cl.⁴ .............................................. B65G 59/02
[52] U.S. Cl. .................................... 414/114; 271/147; 414/117
[58] Field of Search ................. 221/251; 414/112, 114, 414/117, 119, 46, 65; 271/42, 147

[56] References Cited

U.S. PATENT DOCUMENTS

| 3,063,577 | 11/1962 | Shields | 414/46 X |
| 3,176,859 | 4/1965 | Prager | 414/114 |
| 3,612,300 | 10/1971 | Berghgracht | 414/65 |
| 3,815,762 | 6/1974 | Hoke et al. | 414/114 |
| 4,219,294 | 8/1980 | Capdeboscq | 414/46 |
| 4,324,519 | 4/1982 | Moore | 414/113 X |
| 4,457,658 | 7/1984 | Meylan | 414/119 X |
| 4,620,827 | 11/1986 | Sameshima et al. | 414/114 |
| 4,623,292 | 11/1986 | Suzuki et al. | 414/119 X |

FOREIGN PATENT DOCUMENTS 2559316  7/1977  Fed. Rep. of Germany ...... 414/119

Primary Examiner—Frank E. Werner
Assistant Examiner—Janice Krizek
Attorney, Agent, or Firm—Fleit, Jacobson, Cohn & Price

[57] ABSTRACT

Apparatus for pushing stacks or packs, particularly packs of tubular film sections, from a support, preferably from a pallet, on which stacks of packs have been deposited in a plurality of layers, include a pusher, which is movably mounted in a frame and moved by a drive. The frame includes a horizontal track, on which a carriage is movable by a drive, a carrier or carrying frame is guided in the carriage and adapted to be lifted and lowered by the drive, and the carrier or carrying frame carries two rows of depending tinelike fingers, which are displaceable relatively to each other by a drive.

9 Claims, 6 Drawing Figures

APPARATUS FOR PUSHING STACKS OR PACKS FROM A SUPPORT

BACKGROUND OF THE INVENTION

1. Field of the Invention

This invention relates to apparatus for pushing stacks or packs, particularly packs of tubular film sections, from a support, preferably from a pallet, on which said stacks or packs have been deposited in a plurality of layers, comprising a pusher, which is movably mounted in a frame and moved by a drive.

2. Description of the Prior Art

In the manufacture of sacks, a tube-making apparatus is operated to eject tubular film sections at a rate which is much higher than the rate at which said tubular films can be processed by the succeeding end-forming machine. Even if a tube-making machine is succeeded by a plurality of end-forming machines it may be necessary to effect an intermediate storage of the tubular film sections which have been ejected by the tube-making machine and have been stacked to form packs. Such intermediate storage is usually effected by means of a storage belt conveyor. As such belt conveyors also have only a limited capacity it may be necessary to deposit packs of tubular film sections on pallets.

The packs of tubular film sections which have been deposited in a plurality of layers on pallets must be returned to the production process and the tubular film sections must be singled and then supplied to the end-forming machine.

Singling may be effected, e.g., by so-called rotary feeders, which comprise stack magazines to which the packs of tubular film sections are supplied. Such rotary feeder which serves to single the tubular film sections and comprises a conveyor for supplying the packs of tubular film sections and for introducing them into the stack magazine of the rotary feeder is known from Published German Application No. 30 46 280. The apparatus known from Published German Application No. 30 46 280 is also provided with a pusher, by which the packs of tubular film sections supplied by a storage belt conveyor are pushed onto the receiving end of the conveyor which forwards them to the stack magazine.

In apparatus of the kind disclosed in German Patent Specification No. 31 05 154 an intermediate storage of packs of tubular film sections is effected on carrying grates, which are vertically spaced apart to form a plurality of tiers, and said packs are pushed from such grates by means of a pusher onto a conveyor in case of need; the latter conveyor serves to return the packs of tubular film sections into the production process.

The known apparatus can only be used to push packs of tubular film sections from a conveyor or a storage location onto another storage location or a conveyor. But when storage space is no longer available for an intermediate storage of juxtaposed packs of tubular films, then it will be necessary to stack the packs of tubular film sections in a plurality of vertically spaced apart planes, for instance, on pallets. Thus far, the removal of packs of tubular film sections stacked, e.g., on pallets and the deposition of said packs on a conveyor for returning said packs to the production process had to be effected by hand.

SUMMARY OF THE INVENTION

It is an object of the invention to provide apparatus which is of the kind described first hereinbefore and by which packs of tubular film sections, which packs have been stacked in a plurality of superimposed layers, e.g., on a pallet, can be individually delivered to a conveyor for forwarding said packs.

This object is accomplished in accordance with the invention in that the frame comprises horizontal tracks, on which a carriage is movable by a drive, a carrier or carrying frame is guided in said carriage and adapted to be lifted and lowered by the drive, and said carrier or carrying frame carries two rows of depending tinelike fingers, which are displaceable relative to each other by drive means. In the apparatus in accordance with the invention the lower ends of the fingers are disposed approximately in a horizontal plane so that the fingers of the first row will apply pressure to the stack or the pack from which an overlying pack is to be pushed onto the receiving end of the forwarding conveyor. As a result, the underlying stack will be held in position and as a pack of the uppermost layer is pushed off the uppermost tubular film sections of the next lower pack will not be carried along by friction.

To ensure that the fingers will exert a predetermined pressure force on the next lower pack, each finger is desirably provided at its lower end with a plungerlike member, which is adapted to be telescopically forced against spring force into the tubular upper member of the finger.

The uppermost pack can be pushed off more easily and the friction between the packs will be reduced if air blast nozzles are provided adjacent to the lower ends of the pushing fingers

DETAILED DESCRIPTION OF THE PREFERRED EMBODIMENT

Figure 1:
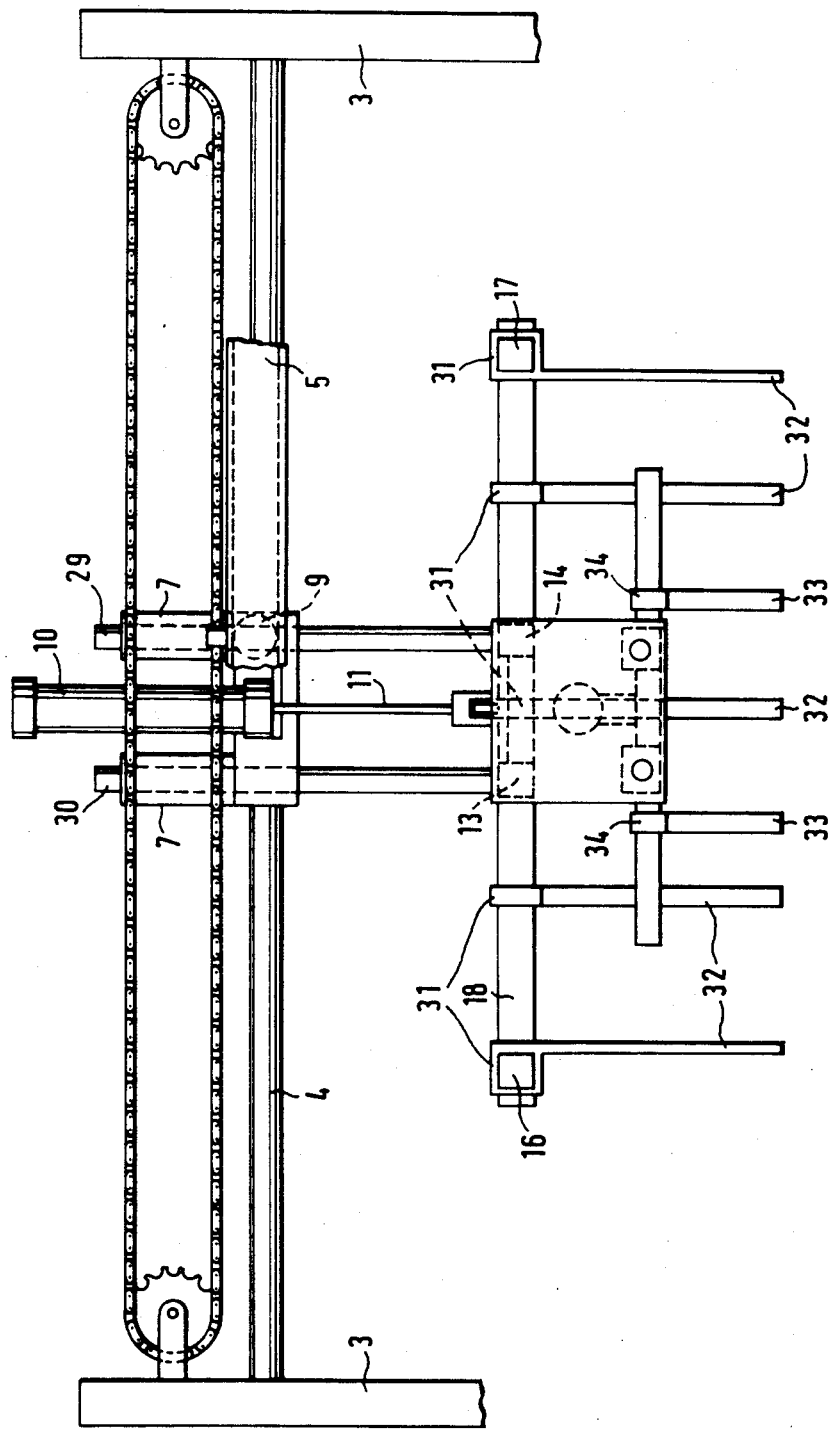
FIG. 1 is a front elevation showing apparatus for pushing packs or the like from a support.

A main frame 1 is shown, which can be moved on wheels 2 in case of need, and comprises two upright side frames 3, which are interconnected by horizontal tracks in the form of a circular-section crossbeam 4 and a channel member 5. A carriage 6 is slidably mounted on the crossbeam 4 and comprises two guide sleeves 7 and a protruding arm 8. A supporting wheel 9 is mounted on the arm 8 at its free end and is guided in the channel member 5 to prevent a tilting of the carriage 6. A piston-cylinder unit 10 comprises a vertical cylinder, which is secured to the arm 8, and a piston rod 11, which centrally engages a plate 12. That plate 12 is welded at opposite ends to two arms 13 and 14 of a carriage frame 15.

In addition to the arms 13 and 14 the carriage frame 15 comprises two additional arms 16 and 17. Each of the arms 13 to 17 is connected at one end to a crossbeam 18. A carrying plate 19 is fixed to the free ends of the two arms 13 and 14. Another carrying plate 20 is welded to the crossbeam 18 approximately at its center. The two carrying plates 19 and 20 serve as carriers for a piston-cylinder unit 21 and for two parallel guide rods 22. The guide rods 22 extend through sleeves 24 and 25, which are interconnected by a cross-beam 23 and each of which carries a protruding arm 26 or 27.

By means of the piston-cylinder unit 21 connected by its piston rod 28 to the crossbeam 23, the sleeves 24 and 25 can be disposed on the guide rods 22 in unison with the arms 26 and 27. In addition to that displacement of the carriage frame 15, the entire carriage frame 15 can be lifted and lowered by means of the piston-cylinder unit 10. To ensure that the carriage frame 15 will be held in a horizontal orientation, two vertical columns 29 and 30 are joined to the arms 13 and 14, respectively, and are slidable in the sleeves 7 of the carriage 6.

Seven fingers 32, which depend approximately vertically, are secured to the carriage frame 15 by means of clamping members 31. Two additional fingers 33 are connected by clamping members 34 to the arms 26 and 27, which are secured to the sleeves 24 and 25.

Figure 2:
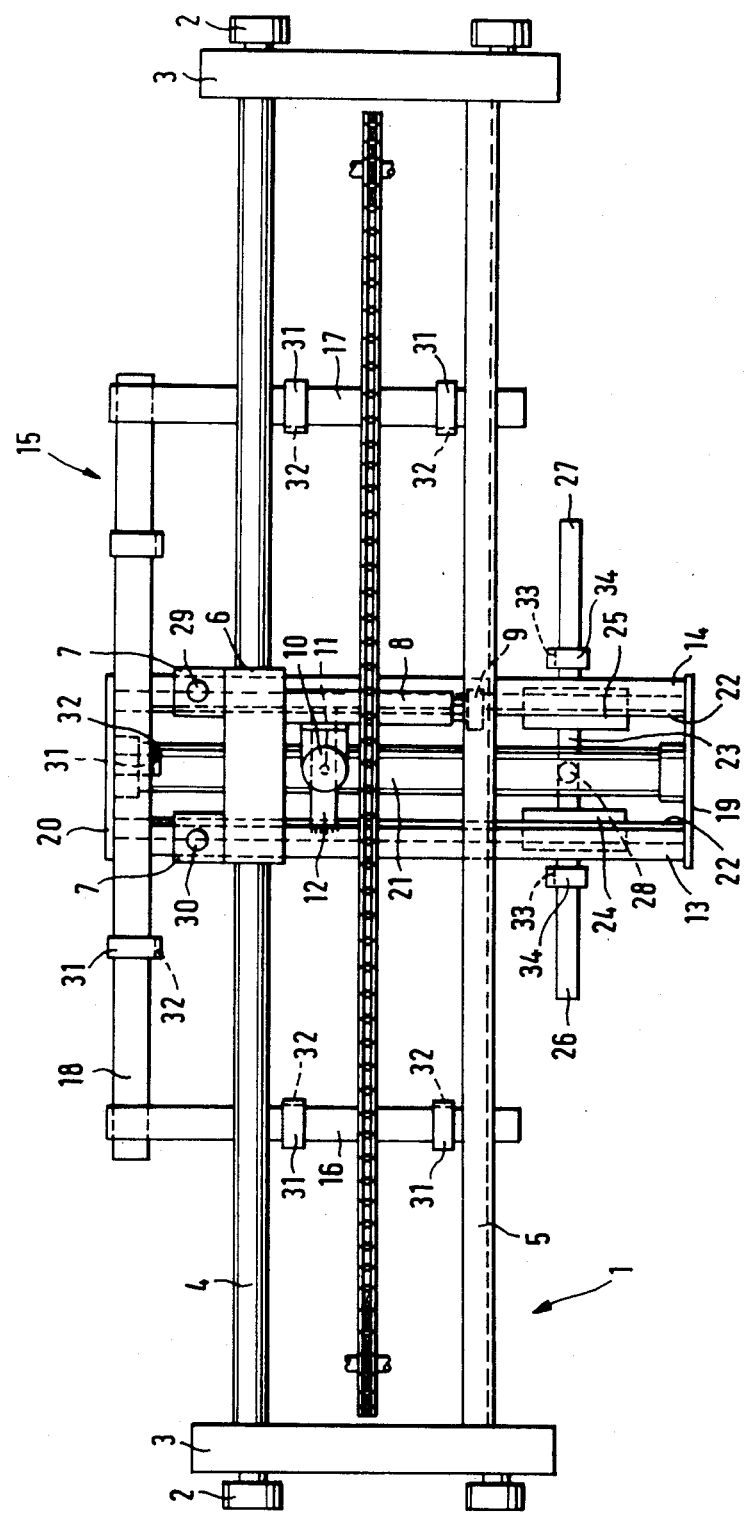
FIG. 2 is a top plan view showing the apparatus according to FIG. 1.
Figure 3:
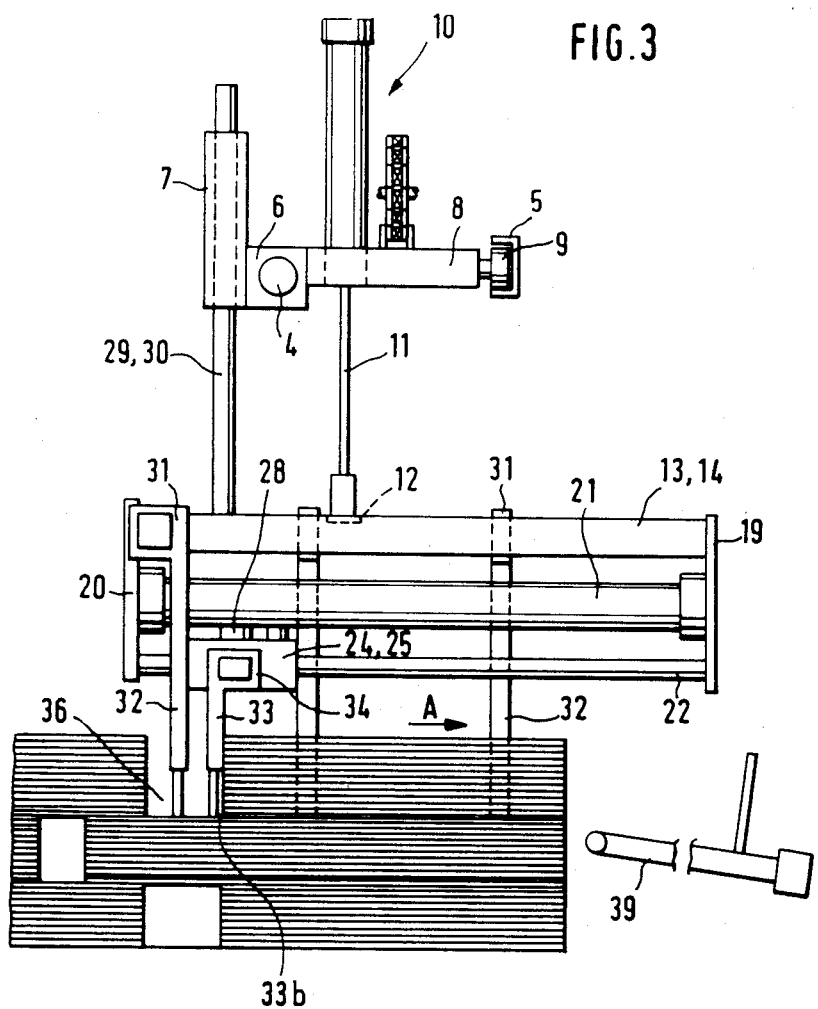
FIG. 3 is a side elevation showing the apparatus of FIG. 1.

For the sake of clearness, the fingers 33 are shown in FIG. 2 in a position differing from that shown in FIG. 3.

The piston-cylinder unit 21 comprises a so-called Orega cylinder, in which the piston rod extends laterally from the piston through a slot formed in the cylinder. Strips are provided for sealing said slots on both sides of the piston rod.

The carriage 6 is actuated by means of a chain, which is trained around chain sprockets and has a lower course that is secured to the arm 8 as shown in FIG. 2. The chain is driven by a motor, not shown.

All piston-cylinder units and drives are provided with control means, which are not shown, and permit a fully automatic operation of the apparatus.

Figure 4:
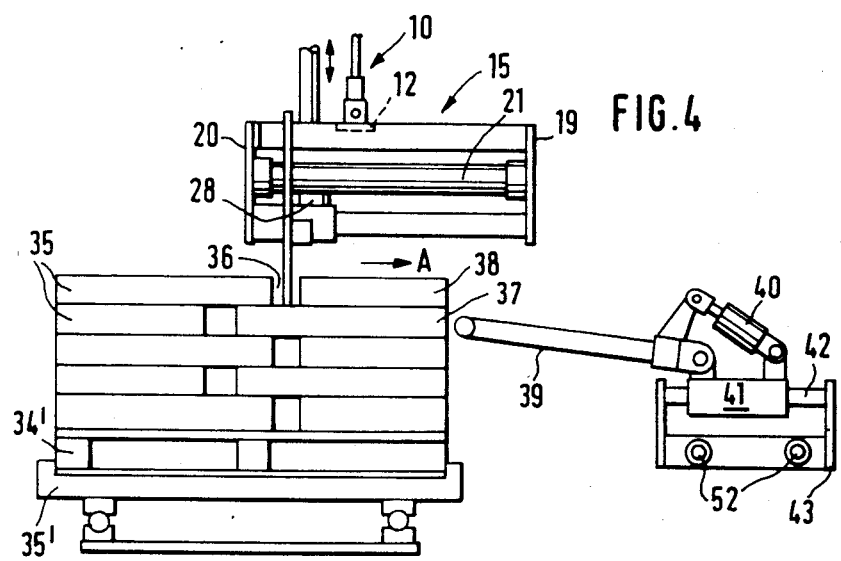
FIG. 4 is a side elevation showing on a reduced scale the apparatus of FIGS. 1 to 3 in a position in which the fingers have been lowered into engagement with packs carried by a pallet before the pushing of a pack onto a forwarding conveyor begins.
Figure 5:
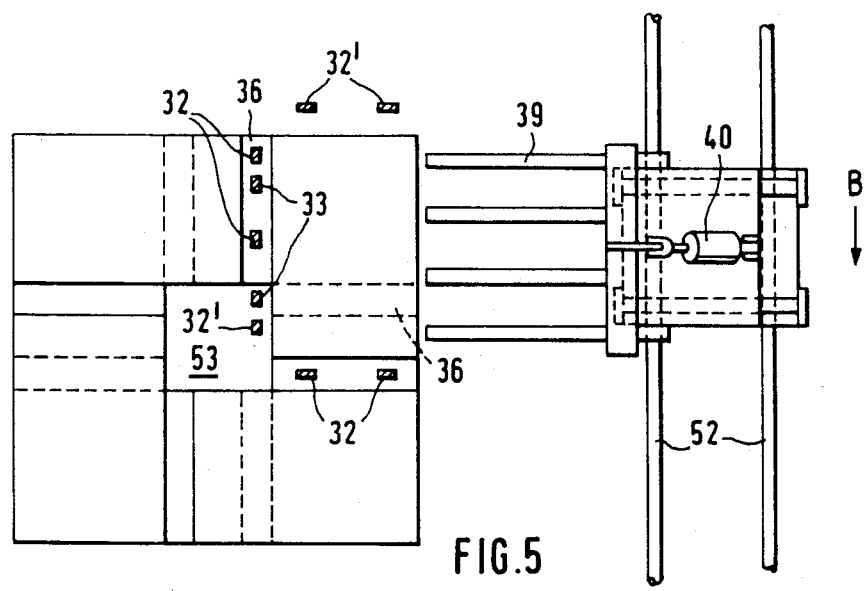
FIG. 5 is a top plan view showing the pallet and the forwarding conveyor of the apparatus of FIG. 4 wherein the pusher has been omitted for the sake of clearness.

The pallet 34' shown in FIGS. 4 and 5 is loaded with packs 35 of tubular film sections arranged in five superimposed layers. Each layer consists of four packs of tubular film layers. The packs in adjacent layers are staggered relative to each other, as is apparent from FIG. 4. By means not shown, the pallet has been deposited onto a lifting and rotary table 35', which is of known kind and disposed below the unstacking apparatus in accordance with the invention.

In FIG. 4 the carriage frame 15 is shown in position to which it has been lowered by means of the piston-cylinder unit 10 and in which the fingers 32 and 33 extend through a gap 36 between adjacent packs of the uppermost layer and apply pressure to an underlying pack 37 of the next lower layer. When that condition has been reached, the piston-cylinder unit 21 is actuated to displace the fingers 33 in the direction of the arrow A so that they push the pack 38 of the uppermost layer from the pack 37 of the next lower layer onto an inclined grate 39, the inclination of which can be adjustable by means of a piston-cylinder unit 40. The grate 39 is part of a belt conveyor system, which is not shown. The grate 39 and/the piston-cylinder unit 40 are secured to a holder 41, which is reciprocable on tracks 42 and adapted to be fixed in position. The tracks 42 are parts of a carriage 43, which can be displaced on circular section beams 52. Because the packs in adjacent layers are staggered relative to each other, such a displacement will be required when all packs of one layer have been removed and the packs of the next lower layer are to be removed.

Figure 6:
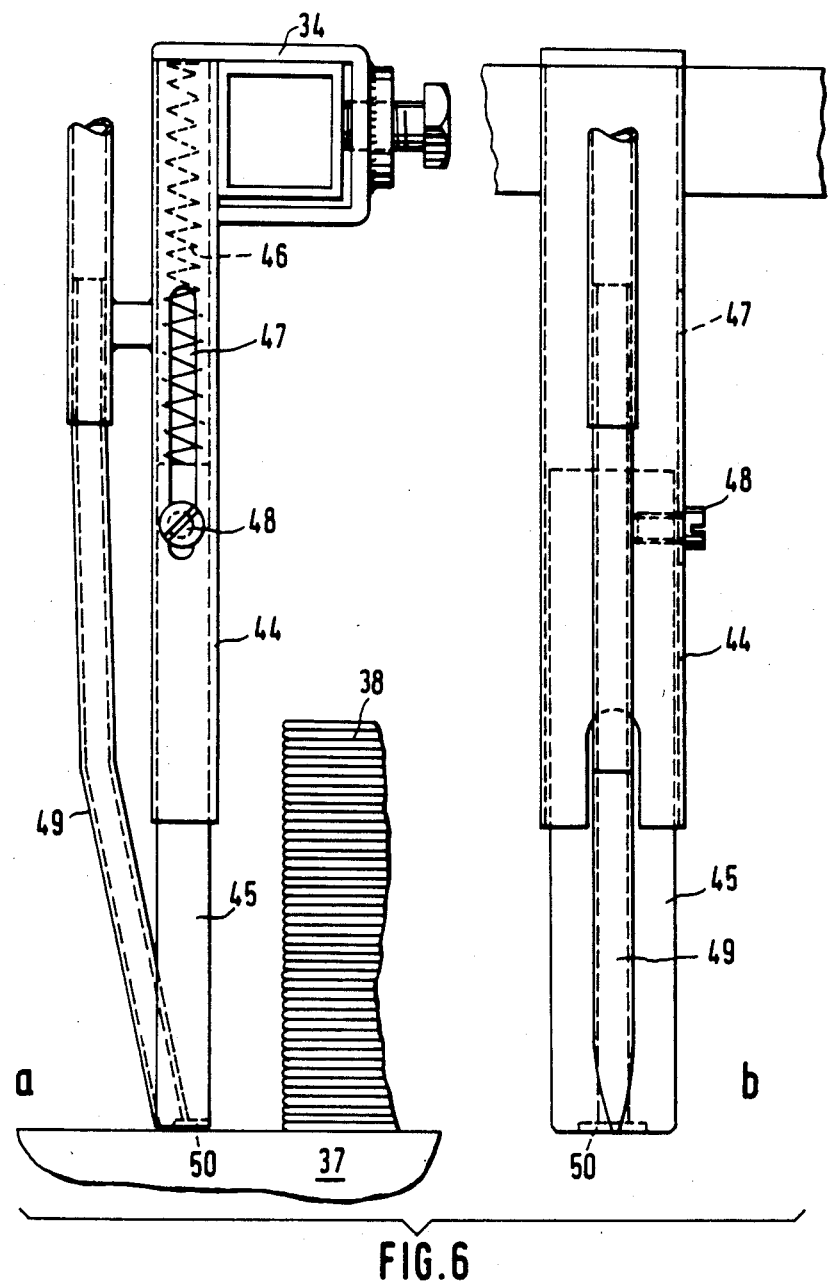
FIG. 6 is a side and rear elevation showing a finger on a larger scale.

As has been mentioned hereinbefore, only the fingers 33 are used to push off a pack while the next lower pack is held in position on the pallet 34' by the fingers 32. It is apparent from FIG. 6 that each finger consists of an upper tubular member 44, which is connected to a clamping member 31 or 34 and which contains a lower tubular member 45, which is biased downwardly by a spring 46. The depth to which the lower tubular member 45 is inserted into the upper one is defined by a slot 47, which is formed in the upper tubular member 44, and a limiting screw 48, Which has been screwed into the lower tubular member 45 and extends through the slot 47. At least those fingers 33 which are used to push off the packs in succession are provided at a lower end with a blade 33b (see FIG. 3) which is movable in contact with the underside of a pack which is to be pushed off, are provided with an air supply line 49, which protrudes into the lower tubular member 45. The latter is provided at its free end with a lower slot 50, which is open toward the pack 38 and through which compressed air can escape. That compressed air ensures that the lowermost tubular film section of a pack 38 to be pushed off will be slightly lifted from the underlying pack 37 so that the pack will not be compressed as it is pushed off.

Whenever a pack has been pushed off, the lifting table 35' must be rotated through 90°. The grate 39 and the unstacking apparatus will not be transversely displaced during the unstacking of a given layer of packs and the fingers 32' have no effect during that time. Because the packs of adjacent layers are staggered relative to each other the entire unstacking apparatus and the grate 39 must be displaced in the direction of the arrow B in FIG. 5 whenever all packs of a layer have been pushed off. After that displacement the fingers 32, which are opposite to the fingers 32', are spaced the same distance from the edge of the stack as the fingers 32' in FIG. 5. It is also apparent from FIG. 5 that pressure is applied to the stack only by one pushing finger 33 at a time whereas the other pushing finger 33 protrudes into the free space 53 left between the packs at the center of the pallet. That finger 33 which freely protrudes into the space 53 will not interfere with the pushing of a pack because that finger will move in the gap 36 of the next lower layer as a pack is pushed off.

I claim:

1. Apparatus for pushing stacks or packs, particularly packs of tubular film sections, from a support, preferably from a pallet, on which said stacks or packs have been deposited in a plurality of layers, comprising: a supporting frame including horizontal tracks; a carriage supported for movement along said horizontal tracks; first drive means for moving said carriage along said horizontal tracks; a carrying frame supported by said carriage; second drive means for raising and lowering said carrying frame relatively to said carriage; said carrying frame including two rows of depending tine-like fingers, which are displaceable relatively to each other; and third drive means for displacing one row of fingers relatively to the other row to push a pack of tubular film sections from a pallet while an underlying pack is retained in a stationary position by the other row.

2. Apparatus according to claim 1, wherein a plurality of fingers are spaced apart in a first row and fixed to the carrying frame, said carrying frame including horizontal guide means that extend at right angles to the horizontal tracks; arms extending parallel to the horizontal tracks which carry a second row of fingers; and arm guiding members which are guided for movement along said guide means.

3. Apparatus according to claim 1, wherein each finger comprises a tubular upper member, a plungerlike lower member, which is telescopically mounted in said upper member, and spring means biasing said lower member downwardly.

4. Apparatus according to claim 3, wherein the tubular upper member is formed with a longitudinally extending slot having ends which constitute stops which limit the displacement of the lower and upper members relative to each other.

5. Apparatus according to claim 2, including air blast nozzles provided adjacent to the lower ends of the fingers of the second row.

6. Apparatus according to claim 3, wherein the lower member of each finger of the second row is provided at its lower ends with a blade, which is movable in contact with the underside of a pack which is to be pushed off.

7. Apparatus according to claim 2, wherein the fingers of the second row are movable into spaces between the fingers of the first row until the fingers of the first and second rows are aligned with each other.

8. Apparatus according to claim 2, wherein the carrying frame is provided with a horizontal arm, which extends at right angles to the carrying frame and carries the fingers of the first row.

9. Apparatus according to claim 1, wherein a rotary table is provided for carrying a pallet that carries packs of tubular film sections, wherein said rotary table is succeeded by a receiving end of a conveyor for receiving packs which have been pushed off the pallet, and said receiving end is adapted to be horizontally displaced and to be lifted and lowered relatively to the pallet.

* * * * *